Patented Apr. 10, 1934

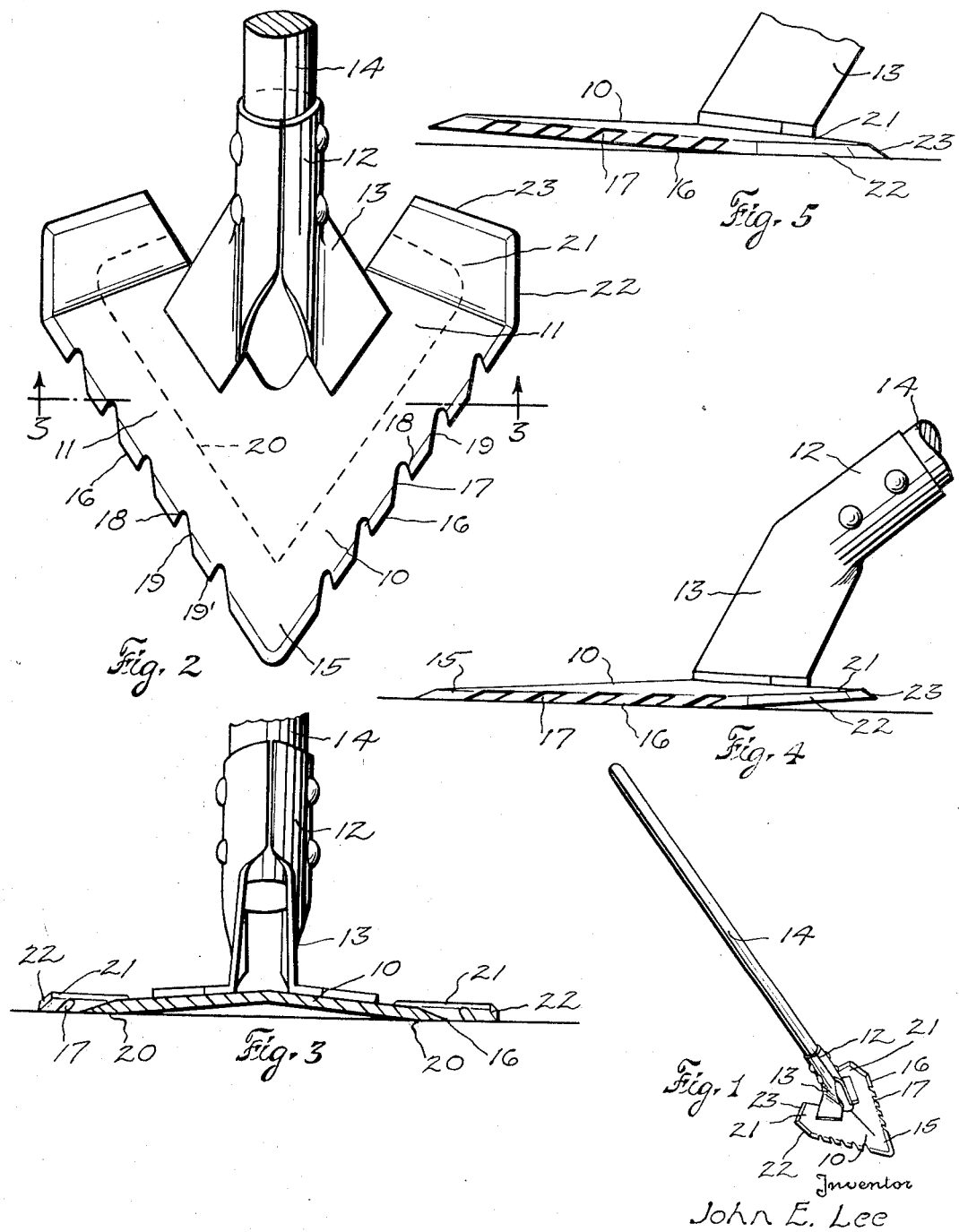

1,954,250

UNITED STATES PATENT OFFICE 1,954,250

WEEDING TOOL

John E. Lee, Fort Worth, Tex., assignor to Wonder Hoe Company, Fort Worth, Tex., a corporation of Texas Application May 9, 1932, Serial No. 610,015

2 Claims. (Cl. 97—68)

This invention relates to new and useful improvements in weeding tools, and more particularly to tools of the horizontally acting hoe type.

One object of the invention is to provide an improved hand tool for efficiently and quickly cutting weeds, grass and the like.

Another object of the invention is to provide a tool, similar to the tool shown in my co-pending application filed June 19, 1931, Serial Number 545,460, and having cutting edges at the rear corners of the blades, said rear edge portions or corners being positioned in a plane at an angle to the plane of the forward portion of the tool, so that one portion is elevated when the other portion of the tool is being used, and whereby a slight movement of the tool will bring the cutting edges of either portion into engagement with the ground and will raise the other portion of the tool.

Still another object of the invention is to provide a tool having rear cutting edges, whereby said tool is capable of cutting growths when slid either forwardly or rearwardly along the ground.

Another object of the invention is to provide a tool, having a portion of the outside edge of each blade lying horizontally on the ground to form runners, and arched between said runners, which serve to protect the fine cutting edges of the blade from excessive wear.

A construction designed to carry out the invention will be hereinafter described together with other features of the invention.

The invention will be more readily understood from a reading of the following specification and by reference to the accompanying drawing in which an example of the invention is shown, and wherein:

Figure 1 is a perspective view of a tool constructed in accordance with the invention, Figure 2 is a plan view of the same, Figure 3 is a transverse sectional view of the tool taken on the line 3—3 of Figure 2, Figure 4 is a side elevation of the tool showing the forward portion in engagement with the ground, the rear cutting edges being elevated, and Figure 5 is a view similar to Figure 4 with the tool tilted rearwardly and showing the front portion raised from the ground.

In the drawing the numeral 10 designates a triangular body or sweep 10 having divergent cutter blades 11 along each side. An upwardly inclined socket 12 is connected to the inner edges of the blades near their rear ends by arms 13. The arms may be spot welded or, in any other way, suitably secured to the blades. An elongated handle 14 has its lower end fastened in the socket 12.

The blades are merged at their forward ends into a triangular cutting point 15 having cutting edges 16 which are continued rearwardly along the outer edge of each blade, preferably at about the same angle as at the point. Substantially V-shaped notches 17 are formed in the cutting edges of the blade. Each notch has a short side 18 and a long side 19 (Figure 1), the side 18 being preferably not more than one half the length of the side 19. The long side of each notch is directed forwardly and the short side is directed outwardly.

It will be seen that the long side 19 of each notch has a tendency to guide the stems, stalks, and the like into the notch, while the short side engages the stem or stalk. Both sides, being cutting edges and converging, will sever the stalk, stem, blade of grass, or other growth received in the notch.

The notches 17, being spaced apart not only provide a point 19' at the rear side of each notch, but also permit the cutting edge 16 between the notches to act upon work not received in the notches. The entire outer edge of each blade including the sides of the notches, forms a continuous cutting edge 16 and when the sweep is pushed forwardly a maximum cutting is had, the entire edge being active.

By observing Figure 3 of the drawing, it will be noted that the tool is arched in the center and flat runners 20 are formed on the underside of the tool at the outer edges of the blades. The runners ride on the surface of the ground and serve to protect the fine outside cutting edges 16 from excessive wear. Also, as the underside of each blade wears, said blade will become more or less self-sharpening.

The rear corners 21 of each blade are disposed in a plane at a slight angle to the plane of the forward portion of the blades (Figure 4). Each corner is provided with a side cutting edge 22 which is substantially parallel with the longitudinal axis of the tool. A broad cutting edge 23 is provided at the rear of the blade, and this edge is disposed at an acute angle to the transverse axis of the tool. When the forward cutting edges 16 are being used (Figure 4), and the tool is being pushed forwardly, the rear corners 21, due to their angular disposition, will be elevated from the ground. This eliminates all unnecessary and undue wear on the rear cutting edges 22 and 23. It is noted that a slight downward movement on the handle 14 will bring the rear corners 21 into engagement with the ground (Figure 5) whereby the front portion of the tool will be raised, thus saving it from undue wear.

It is obvious that in using the tool no downward stroke is necessary. When it is desired to use the cutting edges 16, a forward horizontal stroke will cause the forward portion of the tool to engage the ground, whereby the rear corners are elevated, and any growth in the path of the tool will be cut. If it is desired to use the rear cutting edges 22 and 23, a slight downward tilting of the handle is sufficient to bring the rear corners 21 into engagement with the ground.

The broad cutting edge 23 and the side cutting edge 22 enable the operator to easily cut growths around bridge abutments, railroad ties, and other places which can not be cut with the forward end of the tool. Also, it is noted that with this tool, the operator can clean growth from around trees and shrubbery without changing his position, as the forward, sideways, or backward movements of the hoe sliding on the ground will remove all growths.

The side cutting edges 22 at the rear of the blade, being disposed substantially parallel to the longitudinal axis of the tool, make it possible to cut grass, weeds, and the like along a curbing, railroad tie, etc., by pushing the tool along the edge of the same, in a straight line and without changing the position of the tool. When the tool is pulled rearwardly and the rear cutting edge 23 is riding on the surface of the ground, said cutting edge, due to its disposition at an angle to the transverse axis of the tool, has a tendency to slice the stems or stalks which come into contact with the same. It will be seen that, due to the angular disposition of the front and rear portions of the blades, a slight rocking movement of the same will bring either one or the other into engagement with the ground.

Although the tool has been used satisfactorily for the purposes hereinbefore set forth, it could also be used as a grubbing hoe, or light axe to chop heavy weeds, or small timber growth. It is especially adapted for removing cactus, as the large, broad branches are sliced, or detached from the main stalk, with a chopping motion as with an axe. The long handle makes it easy and efficient in that it protects the hands and limbs. Thus the tool serves a double purpose with efficiency and without undue weight or conflict of the dual parts, one with the other.

It is pointed out that no claim is made to any of the parts as shown in my co-pending application filed June 19, 1931, Serial Number 545,460, and that the features of this tool are the rear cutting edges 22 and 23 provided on the rear corners 21, of the blades, the angular disposition of said corners, and the runners formed on the underside of the blades.

The description which has been given, recites more or less detail of a particular embodiment of the invention, which is set forth as new and useful, however, I desire it understood that the invention is not limited to such exact details of construction, because it is manifest that changes and modifications may be made, within the scope of the appended claims, without departing from the spirit of the invention.

Having illustrated and described a preferred form of the invention, what I claim is:

1. A reciprocating weed and grass cutting tool comprising, a hoe having divergent blades provided with cutting edges and spaced notches in said edges for cutting upon a forward movement of the hoe, flat cutting blades at the rear ends of said diverging blades for cutting and slicing upon a rearward movement of said hoe, and flat runners formed on the undersides of both blades, the rear cutting blades being inclined upwardly from the divergent blades.

2. A reciprocating weed and grass cutting tool comprising, a hoe having divergent blades provided with cutting edges and spaced notches in said edges for cutting upon a forward movement of the hoe, flat cutting blades at the rear ends of said diverging blades, each having cutting edges at an obtuse angle to each other for cutting and slicing upon a rearward movement of said hoe, and flat runners formed on the undersides of both blades, the rear cutting blades being inclined upwardly from the divergent blades.

JOHN E. LEE.